(12) United States Patent
Berti et al.

(10) Patent No.: US 11,067,096 B2
(45) Date of Patent: Jul. 20, 2021

(54) TURBOMACHINE ASSEMBLY

(71) Applicant: Nuovo Pignone Srl, Florence (IT)

(72) Inventors: Matteo Berti, Florence (IT); Paolo Delturco, Florence (IT); Matteo Dall'ara, Florence (IT); Alberto Scotti Del Greco, Florence (IT)

(73) Assignee: Nuovo Pignone Srl, Florence (IT)

( * ) Notice: Subject to any disclaimer, the term of this patent is extended or adjusted under 35 U.S.C. 154(b) by 526 days.

(21) Appl. No.: 15/124,929

(22) PCT Filed: Mar. 9, 2015

(86) PCT No.: PCT/EP2015/054848
§ 371 (c)(1),
(2) Date: Sep. 9, 2016

(87) PCT Pub. No.: WO2015/135878
PCT Pub. Date: Sep. 17, 2015

(65) Prior Publication Data
US 2017/0023011 A1 Jan. 26, 2017

(30) Foreign Application Priority Data
Mar. 11, 2014 (IT) .......................... CO2014A000004

(51) Int. Cl.
*F04D 29/46* (2006.01)
*F02C 7/36* (2006.01)
(Continued)

(52) U.S. Cl.
CPC ........... *F04D 29/462* (2013.01); *F01D 25/16* (2013.01); *F01K 5/02* (2013.01); *F02C 6/12* (2013.01);
(Continued)

(58) Field of Classification Search
CPC ...... F04D 29/462; F04D 29/46; F04D 29/464; F04D 29/466; F04D 29/468; F04D 29/44
(Continued)

(56) References Cited

U.S. PATENT DOCUMENTS 3,289,436 A * 12/1966 Groves .................. B64D 13/04
62/402
5,014,518 A * 5/1991 Thomson ............... B64D 13/06
60/684
(Continued)

FOREIGN PATENT DOCUMENTS

CN 102312726 A 1/2012
CN 102859122 A 1/2013
(Continued)

OTHER PUBLICATIONS

Italian Search Report and Written Opinion issued in connection with corresponding Italian priority application CO20140004 dated May 27, 2014.
(Continued)

*Primary Examiner* — Richard A Edgar
*Assistant Examiner* — Jackson N Gillenwaters
(74) *Attorney, Agent, or Firm* — Baker Hughes Patent Org.

(57) ABSTRACT

The present disclosure relates to a turbomachine assembly, which includes a shaft, a radial gas expander supported on the shaft between a first bearing and a second bearing, and a compressor supported on the shaft in overhung position adjacent to one or the other of the first and second bearings. The compressor includes a plurality of movable inlet nozzles and the radial gas expander includes a plurality of movable guide vanes.

9 Claims, 2 Drawing Sheets

(51) Int. Cl.
*F01K 5/02* (2006.01)
*F01D 25/16* (2006.01)
*F02C 6/12* (2006.01)
*F04D 25/04* (2006.01)
*F04D 17/10* (2006.01)
*F04D 17/16* (2006.01)
*F04D 29/053* (2006.01)
*F04D 29/056* (2006.01)
*F04D 29/44* (2006.01)

(52) U.S. Cl.
CPC ............... *F02C 7/36* (2013.01); *F04D 17/10* (2013.01); *F04D 17/16* (2013.01); *F04D 25/04* (2013.01); *F04D 29/053* (2013.01); *F04D 29/056* (2013.01); *F04D 29/444* (2013.01)

(58) Field of Classification Search
USPC ........................................................ 415/151
See application file for complete search history.

(56) References Cited

U.S. PATENT DOCUMENTS

| | | | |
|---|---|---|---|
| 2006/0086090 A1 | 4/2006 | Kilkenny et al. | |
| 2007/0286716 A1* | 12/2007 | Noelle | F01D 17/165 415/150 |
| 2012/0160021 A1* | 6/2012 | Iannuzzi | F02C 3/22 73/112.05 |
| 2013/0091869 A1* | 4/2013 | Bardon | F01D 15/005 62/6 |
| 2013/0108483 A1 | 5/2013 | Becker et al. | |
| 2014/0064952 A1* | 3/2014 | Clemen | F01D 5/14 415/208.2 |
| 2015/0292349 A1* | 10/2015 | Mariotti | F01D 17/16 415/1 |

FOREIGN PATENT DOCUMENTS

| | | |
|---|---|---|
| CN | 103582742 A | 2/2014 |
| DE | 102006027738 A1 | 12/2007 |
| EP | 2 400 117 A1 | 12/2011 |
| GB | 1127456 A | 9/1968 |
| JP | 5058606 A | 5/1975 |
| JP | 5313014 A | 2/1978 |
| JP | 62243997 A | 10/1987 |
| JP | 2011132877 A | 7/2011 |
| JP | 2012002140 A | 1/2012 |

OTHER PUBLICATIONS

International Search Report and Written Opinion issued in connection with corresponding PCT application No. PCT/EP2015/054848 dated May 11, 2015.
Unofficial English translation of Chinese Office Action issued in connection with corresponding CN Application No. 201580013109.1 dated Feb. 4, 2017.
Third Office Action and search issued in connection with corresponding CN Application No. 201580013109.1 dated Apr. 10, 2018.
Second Office Action and search issued in connection with corresponding CN Application No. 201580013109.1 dated Apr. 28, 2017.
Notice of acceptance issued in connection with corresponding RU Application No. 2016135342 dated Aug. 6, 2018.
Machine Translation and Notification of Reasons for Refusal issued in connection with corresponding JP Application No. 2016-555819 dated Dec. 18, 2018.

\* cited by examiner

TURBOMACHINE ASSEMBLY

TECHNICAL FIELD

Embodiments of the present invention relate to a turbomachine assembly, particularly an integral turbocompressor-turboexpander assembly.

BACKGROUND

Turboexpanders are widely used for industrial refrigeration, oil and gas processing, and in low temperature processes. In some known applications, turboexpanders are used in organic Rankine cycles (ORC).

When an organic Rankine cycles is used in a mechanical drive application, a turboexpander is normally connected to a turbocompressor, which is used to compress a process gas. The connection requires the operative gas in the Rankine cycle to be separated from the process gas circulating in the turbocompressor. In addition, the turboexpander and the turbocompressor normally operate at different speeds. For these reasons, the turbocompressor requires a high speed shaft which is connected to the turboexpander shaft by means of a gearbox or of a hydraulic coupling able to vary the speed ratio. The two separated shafts permit the two gasses to be kept separated, and the gearbox (or hydraulic coupling) permits the speed of the turbocompressor to be varied from the speed of the turboexpander.

The main drawback of this solution is the fact that two shaft mountings and the connection between them normally imply a large number of bearings, seals, complex components (for example gear wheels) and auxiliaries, thus increasing losses and cost.

The gearbox configuration is also limited in power due to gearbox inevitable limitations of power and size.

It may therefore be useful to modify known turbocompressor-turboexpander assemblies in order to achieve lower losses and costs, by reducing the overall assembly complexity, in particular in terms of the total number of components, without diminishing the assembly overall performance.

BRIEF DESCRIPTION

According to a first embodiment, the present invention accomplishes such an object by providing a turbomachine assembly, which includes a shaft, a radial gas expander supported on the shaft between at least one first bearing and at least one second bearing, and a compressor supported on the shaft in an overhung position adjacent to at least one of the first or second bearings. The compressor includes a plurality of movable inlet nozzles and the radial gas expander includes a plurality of movable guide vanes.

Movable nozzles and vanes are used to regulate overall process and maximize the efficiency of the machine in all operating conditions. This can be done independently for the expander and the compressor, thus allowing the compressor and expander to be operated at the same speed, and therefore overcoming the need for a gearbox or hydraulic coupling between them.

Further advantages of the present invention are achieved with a turbomachine assembly obtained in accordance with other embodiments. For example, the insertion of a seal on the shaft between the expander and compressor impellers allows two different gasses to be operated by them.

BRIEF DESCRIPTION OF THE DRAWINGS

Other objects, features, and advantages of the present invention will become evident from the following description of the embodiments of the invention taken in conjunction with the following drawings, wherein.

DETAILED DESCRIPTION

Figure 1:
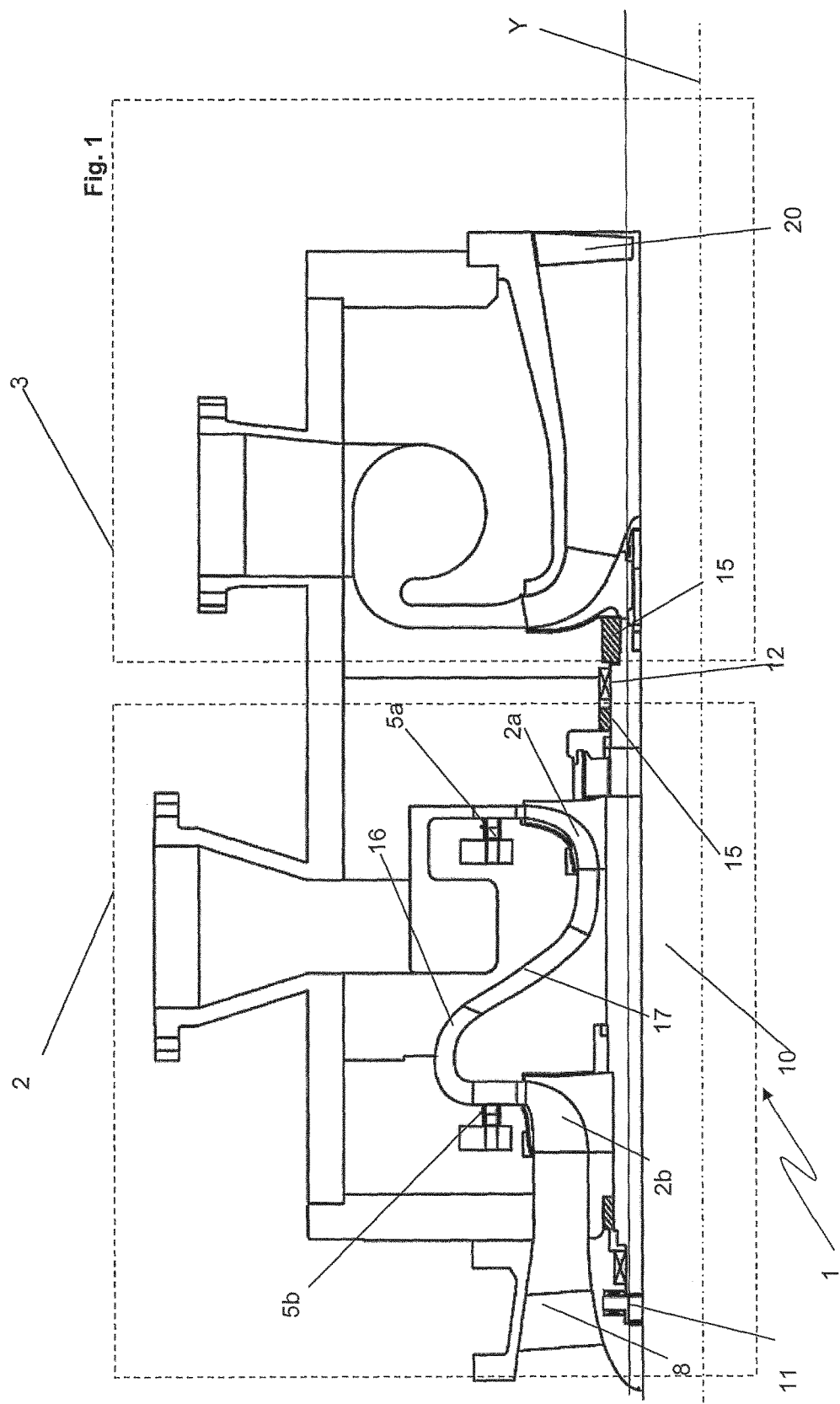
FIG. 1 is a sectional lateral view of a turbomachine assembly according to an embodiment of the present invention.

With reference to the attached figures, a turbomachine assembly 1 includes a shaft 10 having a rotation axis Y, a radial gas expander 2 supported on the shaft 10 between a first group of bearings 11 and a second group of bearings 12, and a centrifugal compressor 3 supported on the shaft 10 in overhung position.

In a typical embodiment of the present invention the radial gas expander 2 is included in an organic Rankine cycle operating a suitable organic gas, for example cyclopentane. However, embodiments of the present invention are not limited to organic Rankine cycle or to a specific gas operated by the radial gas expander 2.

The turboexpander 2 includes a first, high pressure stage 2a and a second, low pressure stage 2b. The working fluid enters the first, high pressure stage 2a of the turboexpander 2, exits the first turboexpander stage 2a to be delivered through an interstage path 16 to the inlet of the second, low pressure stage 2b of the turboexpander 2. The path 16 includes a plurality of struts 17 for guiding the gas flow from the first stage 2a to the second stage 2b in order to optimize the efficiency.

Figure 2:
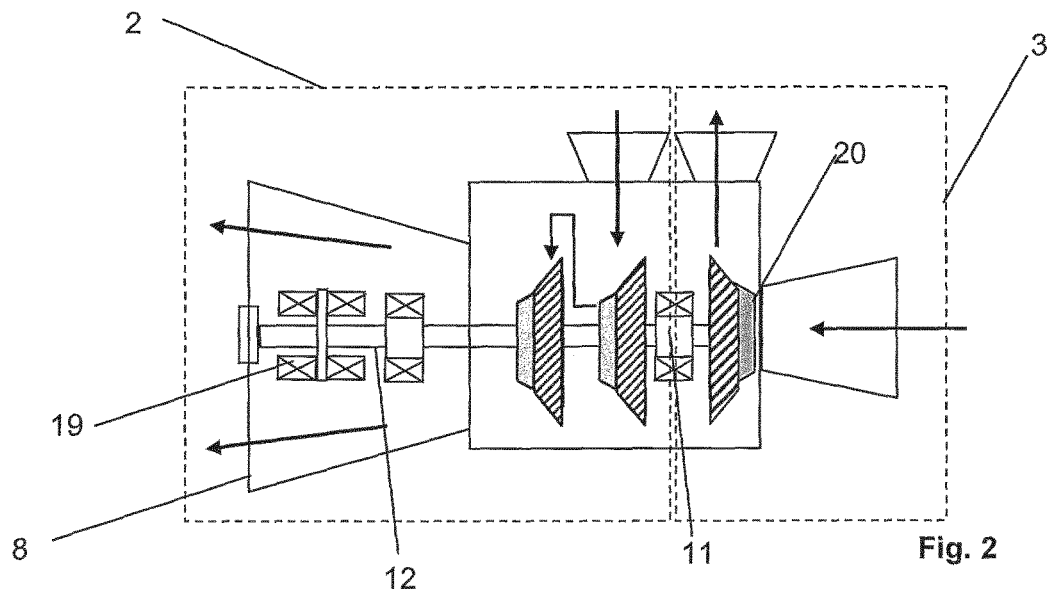
FIG. 2 is a schematic view of the turbomachine of FIG. 1.

With reference to FIGS. 1 and 2, the operative gas enters the high pressure stage 2a radially, flows through a first set of movable inlet guide vanes 5a and then through the impeller of the high pressure stage 2a. The operative gas exits the high pressure stage 2a axially and it is guided by the interstage path 16 to enter the low pressure stage 2b radially after flowing through a second of movable inlet guide vanes 5b. The operative gas exits the low pressure stage 2b axially and is directed outside the turboexpander 2 by an axial outlet 8.

As an alternative (FIG. 3) the operative gas exits the low pressure stage 2b axially and is directed outside the turboexpander 2 by a radial outlet 9.

According to different embodiments of the present invention (not shown) the turboexpander 2 is a single stage turboexpander or a multistage turboexpander having three or more stages.

According to different embodiments of the present invention (not shown) the turboexpander 2 is a multistage turboexpander where some of the stages comprise movable inlet guide vanes and the other stages comprise fixed inlet guide vanes.

In all possible embodiments of the present invention, at least one of the turboexpander stages comprises a movable set of inlet guide vanes.

The radial gas expander 2 is supported on the shaft 10 between a first group of bearings 11, adjacent to the high pressure stage 2a, and a second group of bearings 12, adjacent to the low pressure stage 2b. The groups of bearings 11, 12 are conventional and known in the art and each of them can comprise one or more bearings of the magnetic, gas, or lubricated type, or a combination thereof.

With reference to FIGS. 1 and 2, the centrifugal compressor 3 is supported on the shaft 10 in an overhung position, adjacent to the first group of bearings 11.

As an alternative (FIG. 3), the centrifugal compressor 3 is supported on the shaft 10 in overhung position, adjacent to the second group of bearings 12.

Figure 3:
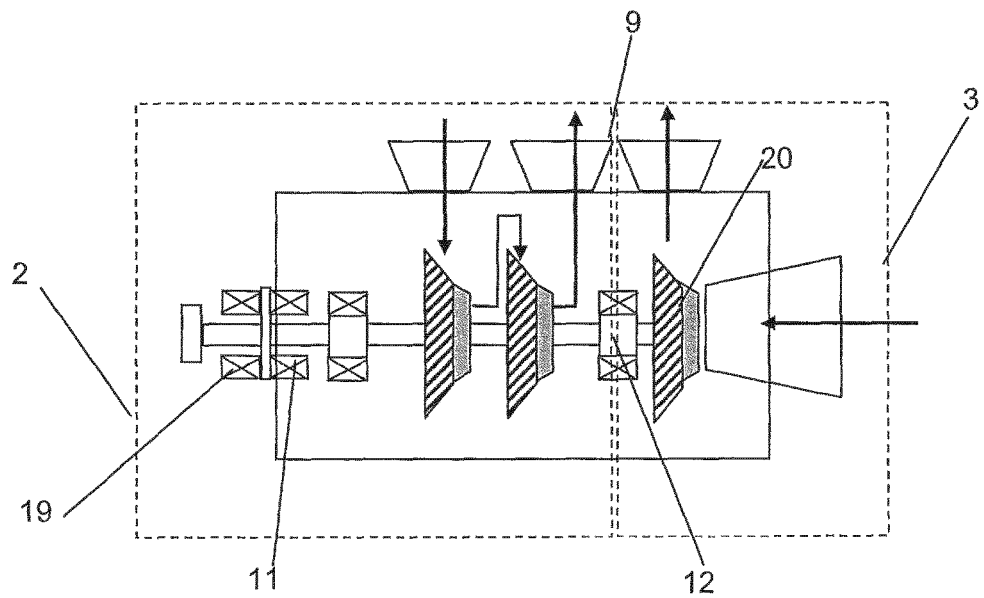
FIG. 3 is a schematic view of a possible variant, in accordance with an embodiment of the present invention, of the turbomachine of FIG. 1.

In both the embodiments of FIGS. 2 and 3, a process gas enters the turbocompressor 3 axially, flows through a plurality of movable inlet nozzles 20, then through an impeller and finally exits the turbocompressor 3 radially.

In general, according to embodiments of the present invention, the plurality of movable inlet nozzles 20 is optional and there are possible embodiments which do not include them.

Embodiments of the present invention are however not limited to a particular type of turbocompressor, for example a double flow compressor may be used instead of a single flow compressor.

The centrifugal compressor 3 processes, for example, a refrigerant fluid in an LNG system or a gas to be forwarded in a pipeline.

As a further alternative embodiment (not shown), the turbomachine assembly 1, when the turboexpander 2 produces more power than needed by a single turbocompressor, includes two overhung turbocompressors respectively adjacent to the first and second group of bearings 11, 12. As a variant of the last embodiment, turbomachine assembly 1 includes one overhung turbocompressor and one overhung electric generator respectively adjacent to the first and second group of bearings 11, 12.

In all the embodiments, the compressors, being mounted on the same shaft 10 of the turboexpander 2, are operated at the same speed n of the turboexpander 2. The value of speed n can be constant or variable.

The embodiments of FIGS. 2 and 3 can be operated at constant speed. In such embodiments, the inlet guide vanes 5a, 5b and the inlet nozzles 20 permit to vary the operating point of the turboexpander 2 and the turbocompressor 3, respectively, in order to vary, for example, the inlet/outlet pressures or mass flow rate of each gas in the turboexpander 2 and in the turbocompressor 3. The operating points of the turboexpander 2 and the turbocompressor 3 are therefore varied independently from one another without needing to differentiate the relevant speeds, thus allowing a single shaft to be used for both the turboexpander 2 and the turbocompressor 3.

In other embodiments (not shown), where the movable inlet nozzles 20 are not present, the operating point of the turbocompressor can be varied by changing the rotating speed n of the shaft 10, while the operating point of the turboexpander 2 is varied by operating the inlet guide vanes 5a, 5b accordingly. The operating points of the turboexpander 2 and the turbocompressor 3 are therefore varied independently also in these embodiments.

Between the radial gas turboexpander 2 and the turbocompressor 3, the turbomachine assembly 1 includes two seals 15, provided on the shaft 10 in respective position adjacent to the impellers of the turbocompressor of the turboexpander stage which is closer to the turbocompressor (high pressure stage in the embodiment of FIG. 2, low pressure stage in the embodiment of FIG. 3). Seals 15, which are conventional and known in the art, permit to separate from one another the two gasses respectively flowing in the turboexpander 2 and in the turbocompressor 3, thus allowing different gasses to be used in the turboexpander 2 and in the turbocompressor 3.

With reference to FIGS. 2 and 3, at an axial end of the shaft 10 opposite to the turbocompressor 3, the turbomachine assembly 1 further includes a balance drum 19 to compensate the sum of axial thrusts generated in operation by the turboexpander 2 and the turbocompressor 3.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions.

The invention claimed is:

1. A turbomachine assembly comprising:
a single shaft;
a radial gas expander supported on the single shaft between at least one first bearing and at least one second bearing, the radial gas expander comprising at least two radial stages coupled via an interstage path, the at least two radial stages including a high pressure stage and a low pressure stage, a plurality of movable guide vanes comprising a first set of movable guide vanes in the high pressure stage and a second set of movable guide vanes in the low pressure stage, a plurality of struts included in the interstage path configured to guide a gas flow from the high pressure stage to the low pressure stage; and
a compressor supported on the single shaft in an overhung position adjacent to at least one of the first or second bearing, the compressor including a plurality of movable inlet nozzles,
wherein the movable inlet nozzles and the movable guide vanes are configured to permit varying operating points of the radial gas expander and the compressor, respectively, such that the operating points of the radial gas expander and the compressor are varied independently from one another without needing to differentiate the relevant speeds enabling the single shaft to be used for both the radial gas expander and the compressor,
wherein an operative gas of the radial gas expander is different from a process gas of the compressor, and
wherein at least a seal is provided on the single shaft between the compressor and the radial gas expander to separate the operative gas of the radial gas expander from the process gas of the compressor.

2. The turbomachine assembly according to claim 1, wherein the first set of movable guide vanes and the second set of movable guide vanes are actuated independently from relative to each other.

3. The turbomachine assembly according to claim 1, wherein the radial gas expander is part of an organic Rankine cycle.

4. The turbomachine assembly according to claim 1, wherein the single shaft operates at a variable speed.

5. The turbomachine assembly according to claim 1, wherein the single shaft operates at a constant speed.

6. The turbomachine assembly according to claim 1 further comprising a balance drum located at an axial end of the single shaft and opposite the compressor, the balance drum configured to compensate a sum of axial forces generated during operation by the compressor and the radial gas expander.

7. The turbomachine assembly according to claim 1, wherein the operative gas (i) enters the high pressure stage radially, flows through the first set of movable guide vanes, and then through an impeller of the high pressure stage, (ii) exits the high pressure stage axially and is guided by the interstage conduit to enter the low pressure stage radially after flowing through the second set of movable guide vanes, and (iii) exits the low pressure stage axially and is directed outside the turboexpander by an axial outlet.

8. The turbomachine assembly according to claim 1, wherein the radial expander comprises an additional stage having fixed inlet guide vanes.

9. The turbomachine assembly according to claim 1, further comprising an electric generator adjacent to the at least one first bearing and the at least one second bearing.

* * * * *